UNITED STATES PATENT OFFICE.

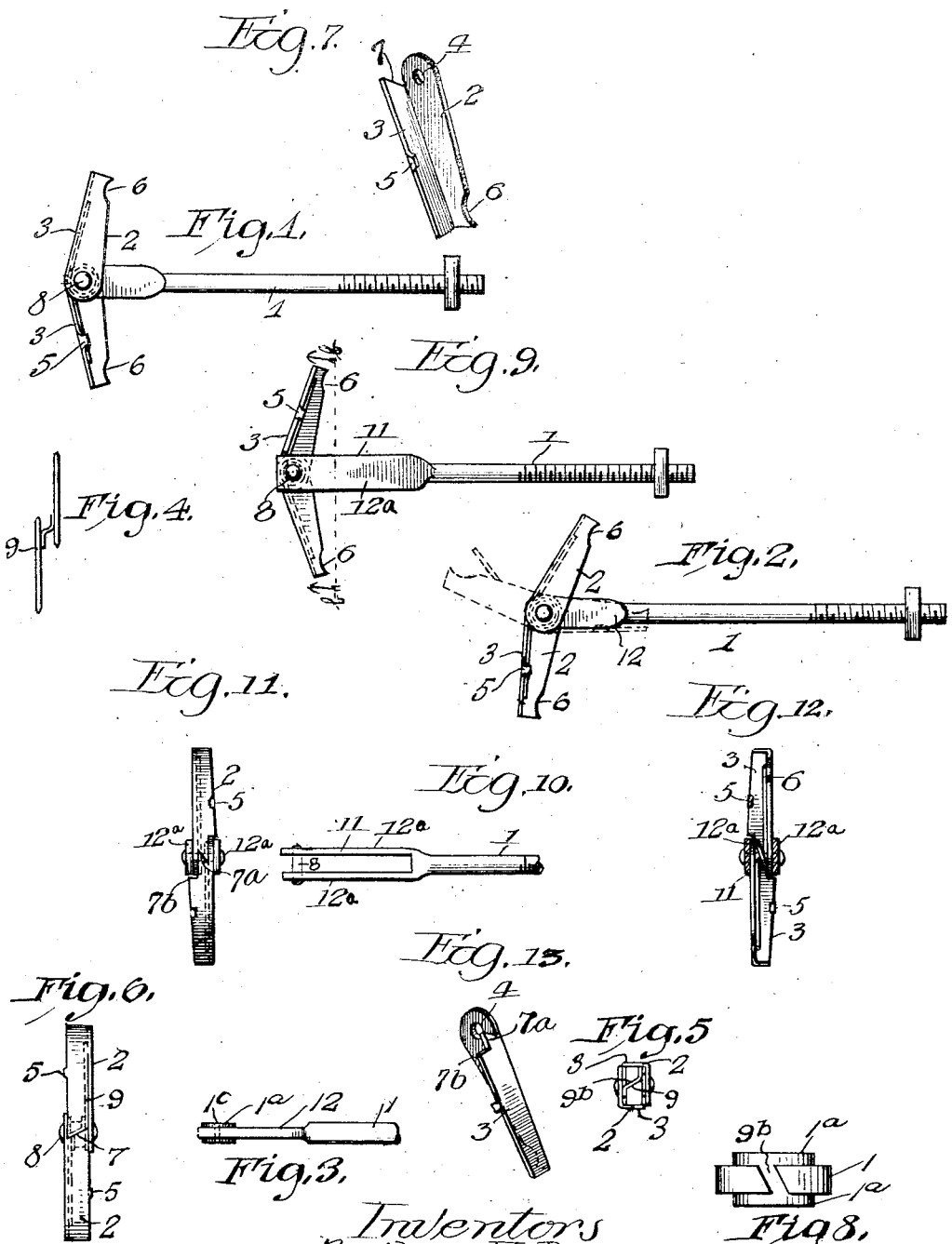

MATHEW H. PAINE, OF GLENELLYN, AND WINFIELD S. WILLIAMS, OF CHICAGO, ILLINOIS, ASSIGNORS TO PAINE COMPANY, A CORPORATION OF ILLINOIS.

ANCHORING DEVICE.

1,396,279.

Specification of Letters Patent.   Patented Nov. 8, 1921.

Application filed July 6, 1917. Serial No. 178,926.

*To all whom it may concern:*

Be it known that we, MATHEW H. PAINE, of Glenellyn, Ill., and WINFIELD S. WILLIAMS, of 4533 Greenwood Ave., Chicago, Ill., citizens of the United States of America, have invented a certain new and useful Improvement in Anchoring Devices, of which the following is a specification.

This invention relates to improvements in anchoring devices and more particularly to toggle bolts of the double-wing type, such as are now commonly used for supporting objects against hollow walls, ceilings and the like. The present application is a continuation in part of application Serial No. 772,590, filed June 9, 1913, now Patent No. 1,269,302, dated June 11, 1918, and application Serial No. 169,553, filed May 18, 1917.

The objects and advantages of the invention will become apparent to those skilled in the art from a reading of the following specification taken in connection with the accompanying drawings wherein two forms of the invention are illustrated.

In the drawings—

Figure 1 is a side elevation of a toggle bolt, constructed in accordance with the present invention;

Fig. 2 is a view similar to Fig. 1, illustrating the adjustability of the anchoring members with relation to the bolt;

Fig. 3 is a detail view of one end of the bolt;

Fig. 4 is a detail view of the spring member which serves to spread the anchoring members when the device is assembled;

Fig. 5 is an end view of the device showing the anchoring members folded down against the sides of the bolt;

Fig. 6 is an end view of the device showing the anchoring members in operative or anchoring position;

Fig. 7 is a detail perspective view of one of the wings or anchoring members;

Fig. 8 is an end view of the bolt showing the spring retaining groove formed therein;

Fig. 9 is a side elevation of a slightly modified form of the invention;

Fig. 10 is a detail view of one end of the bolt shown in Fig. 9;

Fig. 11 is an end view of the device of Fig. 9, showing the anchoring members in operative or anchoring position;

Fig. 12 is a sectional view taken on the line b—b of Fig. 9; and

Fig. 13 is a detail perspective view of one of the wings or anchoring members of the device of Fig. 9.

Referring more in detail to the drawings, the device is shown as comprising a bolt 1, screwthreaded at one end for engagement by a nut or the like. At the other end the bolt is oppositely flattened as at 12 and provided with a transverse opening $1^c$ through which is inserted a pin or rivet 8 forming oppositely projecting trunnions or bearings as shown. Surrounding the opening $1^c$ in the end of the bolt on each of the flattened sides 12 thereof are suitable bosses $1^a$. The wings or truss members of the device are shown at 2, these members in the form of the invention illustrated being L-shaped in cross section, each having a top wall and one side wall 3. At their inner extremities these side walls 3 are apertured for pivotal mounting on opposite ends of the pin 8 substantially as shown. After the wings or anchoring members have been thus positioned, the exposed ends of the pin 8 may be upset so as to provide retaining heads. Spring means, such as spring wire 9, is coiled about one or both of the bosses $1^a$, in such wise that the ends of said wire project in opposite directions from the bolt within the channel or angle portions of the wings, the spring being so mounted that these oppositely projecting ends bear outwardly and upwardly against the top wall of the wings, tending normally to expand the latter into anchoring position. When the spring 9 is coiled about both of the bosses $1^a$, as shown in the drawings, a retaining groove $9^b$ is preferably provided in the end of the bolt 1 adjacent said bosses, this groove serving to receive the strand of the spring wire which connects the coil surrounding one boss with that surrounding the other. In this manner the spring is held against displacement and does not interfere with the free and proper functioning of the wings. In order to prevent displacement of the free ends of the spring 9 from the channels or angles of the wings, suitable down-turned lugs 5 are provided on the top walls thereof, as shown.

At the inner end of each of the wings 2, the top wall thereof is cut at an angle as shown at 7, forming coacting abutments which serve to limit the expansion of the wings relative to each other, and the wings are so mounted on the bolt that the top walls thereof come together slightly in advance of the end of the bolt so that said wings when fully expanded may be freely adjusted angularly with respect to the bolt, as shown more clearly in Fig. 2. Adjacent the outer end of the wings 2, the lower edges of the side walls 3 are notched as at 6, in order to provide a plurality of wall-engaging contacts and the abutments 7, at the inner ends of the wings, are preferably so arranged that expansion of the wings is arrested at a point where only these contacts are presented for engagement with the wall.

In Figs. 9 to 13, inclusive, a slightly modified form of the invention is illustrated. In these figures the bolt 1 is bifurcated at one end to provide prongs 12$^a$, the latter having alining openings extending transversely therethrough, for the reception of the pivot pin 8. In this form of the invention, the wings 2 are mounted on the pin 8 at their inner ends between the prongs 12$^a$ of the bolt, and the spring 9 is coiled directly about the pin 8 between the opposite side walls of the wings, the free ends of the spring extending in opposite directions within the angle of the wings and acting in substantially the same manner as in the form of invention first described. The top wall of each of the wings in this modified showing is also cut at an angle as shown at 7$^a$ to form coacting abutments at the inner ends of the wings and in addition the wings are provided with cut-out portions 7$^b$, designed to permit of slight angular adjustments of the wings with respect to the bolt, this adjustment, however, being limited by the wings coming into contact with the sides of the bolt at the cut-out portions 7$^b$, whereas in the form of invention first described, angular adjustment of the wings when fully expanded is practically unlimited, said wings being movable as a unit in either direction into substantially the plane of the bolt, as shown in Fig. 2. The wings 2 in both forms of the invention may be contracted or folded downwardly against the bolt, the side walls 3 of the wings in the form of the invention first described overlapping the bolt when in this position. In the modified form of the invention, the wings when contracted fold partially within or between the prongs 12$^a$. When the wings are released from folded position the spring 9 acts to expand the same into truss or anchoring formation.

In using an anchoring device constructed in accordance with either form of the invention illustrated, a hole of suitable size is bored in the wall, ceiling or the like to which an object is to be secured. The bolt 1 is then inserted in a hole in the object to be made fast and the nut placed thereon after which the said bolt is pushed head foremost into the hole in the wall, the pressure operating to force or contract the wings 2, as previously described, thus permitting the entire head to pass freely through the hole, whereupon the wings through the medium of the spring means 9 are expanded into truss formation as defined by the coacting abutments at the inner ends thereof. The nut is now tightened up and pressure brought to bear upon the wings until the whole assembly has been drawn into firm holding position. In some instances it may be found feasible in the form of invention shown in Figs. 1 to 8, inclusive, to insert the head of the bolt through the hole provided in the wall or the like by merely positioning the wings as shown in dotted lines in Fig. 2, thus overcoming the necessity of compressing or contracting the wings into overlapping relation against the sides of the bolt.

As will be obvious the present improvements are susceptible of various changes and modifications without departing from the spirit of the invention, and accordingly it is not desired to limit or restrict the same to the particular construction or arrangements of parts herein illustrated, except where limitations appear in the appended claims.

We claim:—

1. In a device of the class described, the combination with a bolt, of a pair of anchoring members pivotally associated with said bolt, tension means for expanding said members into the form of a truss, the latter when fully expanded extending at substantially right angles with respect to said bolt but being capable of angular adjustment relatively thereto.

2. In an anchoring device, the combination with a bolt, of anchoring members pivotally associated with said bolt, said members being substantially L-shaped in cross section, and means for expanding said members into anchoring position.

3. In an anchoring device, a bolt having a yoke at one end thereof, a pair of anchoring members pivotally mounted therein, and means for normally expanding said members, the latter being arranged to engage with each other at their inner ends to limit their expansion.

4. In a device of the class described, a bolt having a yoke at one end thereof, a pivot pin carried by said yoke, a pair of anchoring members mounted on said pin, and said members being of angular shape in cross section and foldable into interlapping relation within said yoke, spring means tending to force said members apart and into anchoring position.

5. An anchoring device comprising a rod, pivotal means carried by the rod, a pair of wings substantially L-shaped in cross section co-axially pivoted on said pivotal means and arranged to fold into overlapping relation, and means for normally causing the wings to unfold.

6. In an anchoring device, the combination with a bolt, of wings swingingly associated with said bolt, means for swinging said wings into a predetermined anchoring position, and coacting means integral with said wings for limiting their expansion.

7. In a device for the purpose specified, the combination of a bolt, and co-axially pivoted wings in operative relation with the bolt, there being means independent of the bolt for limiting the expansion of the wings with respect to each other, substantially as described.

8. In a device for the purpose specified, the combination of a bolt, and a pair of wings pivotally mounted in operative relation with the bolt, the wings being provided with inter-engaging shoulders for determining their limit of expansion with respect to each other, and when fully expanded being capable of angular adjustment with respect to the bolt, substantially as described.

9. In a device of the kind described, the combination of a bolt, and wings pivotally mounted in operative relation to the bolt, each wing being provided with a wall engaging surface, there being means independent of the bolt for arresting the swinging movements of the wings at a point where the wings remain always in such relative angular relation that they contact with the wall only at their extremities, substantially as described.

10. In a device for the purpose specified, the combination of a bolt, and a pair of wings pivotally mounted in operative relation to the bolt, the wings being provided with inter-engaging shoulders for determining their limit of expansion with respect to each other.

11. An expansion device comprising, in combination, a bolt, a pair of wings pivotally mounted upon the bolt, the wings having depending side walls, tension means for expanding the wings situated in the hollow portion of the wings at the pivotal ends thereof, there being means independent of the bolt for determining the limit of expansion of the wings with respect to each other.

12. An expansion device comprising, in combination a bolt, a pair of wings pivotally mounted upon the bolt, the wings having inter-engaging shoulders for determining their limit of expansion with respect to each other, each of said wings at its pivotal end having a portion of its body cut away to provide an opening through which the bolt may protrude without engaging with the wings.

13. An expansion device comprising in combination a bolt, a pair of wings pivotally mounted upon the bolt, the wings having a portion thereof at the pivotal end of each cut away to provide an opening through which the bolt may protrude without engaging with the wings, said wings being formed to engage with each other to determine the limit of their expansion with respect to each other.

14. In a device of the class described, the combination of a bolt, wings pivotally mounted in operative relation to said bolt, said wings having means for determining their limit of expansion with respect to each other, and when fully expanded being capable of angular adjustment with respect to the bolt.

15. In a device of the kind described, the combination of a bolt, a pair of wings pivotally mounted in operative relation to the bolt, and means for normally causing the wings to swing out from the bolt, the wings being arranged to engage with each other to limit their outward swinging movement.

16. In a device of the kind described, the combination with a bolt, of a pair of wings pivotally mounted in operative relation with the bolt, and a shoulder on one wing arranged to engage with the other wing to limit the distending movements of the wings.

17. In a device of the character described, the combination of a bolt, and wings swingingly associated therewith, there being means independent of the bolt for limiting the expansion of the wings with respect to each other.

MATHEW H. PAINE.
WINFIELD S. WILLIAMS.